Oct. 3, 1950  F. R. CHESTER  2,524,425
CHANGE SPEED GEARING FOR MIXERS
Filed Nov. 12, 1946  3 Sheets-Sheet 1
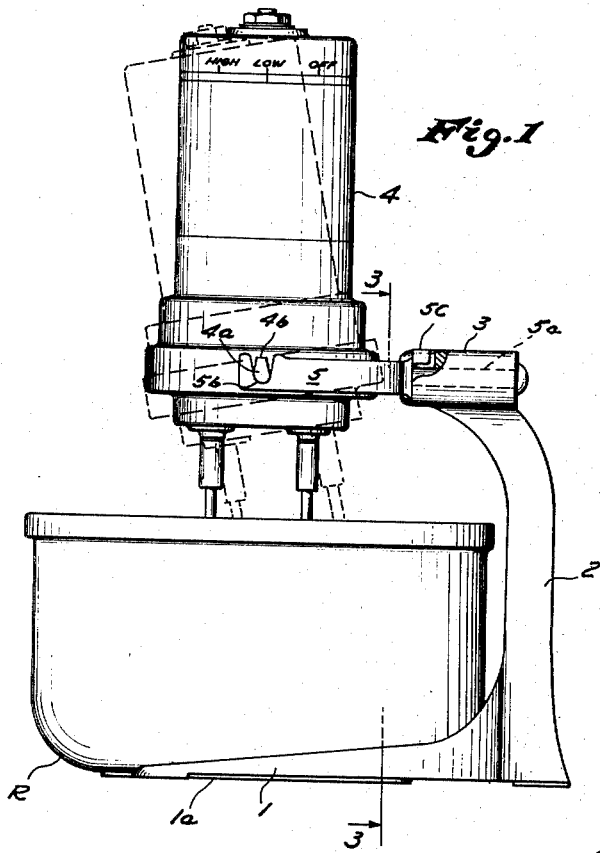
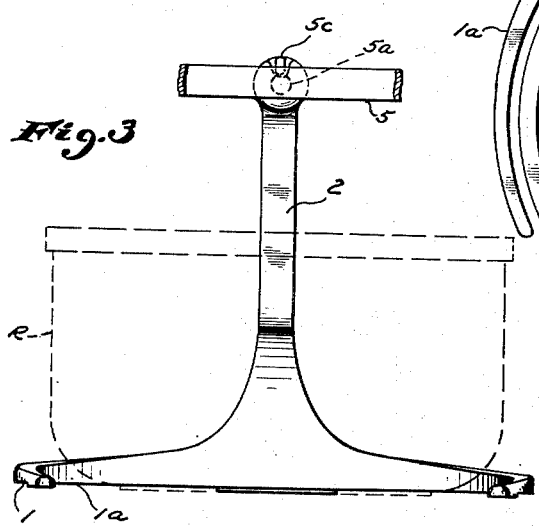
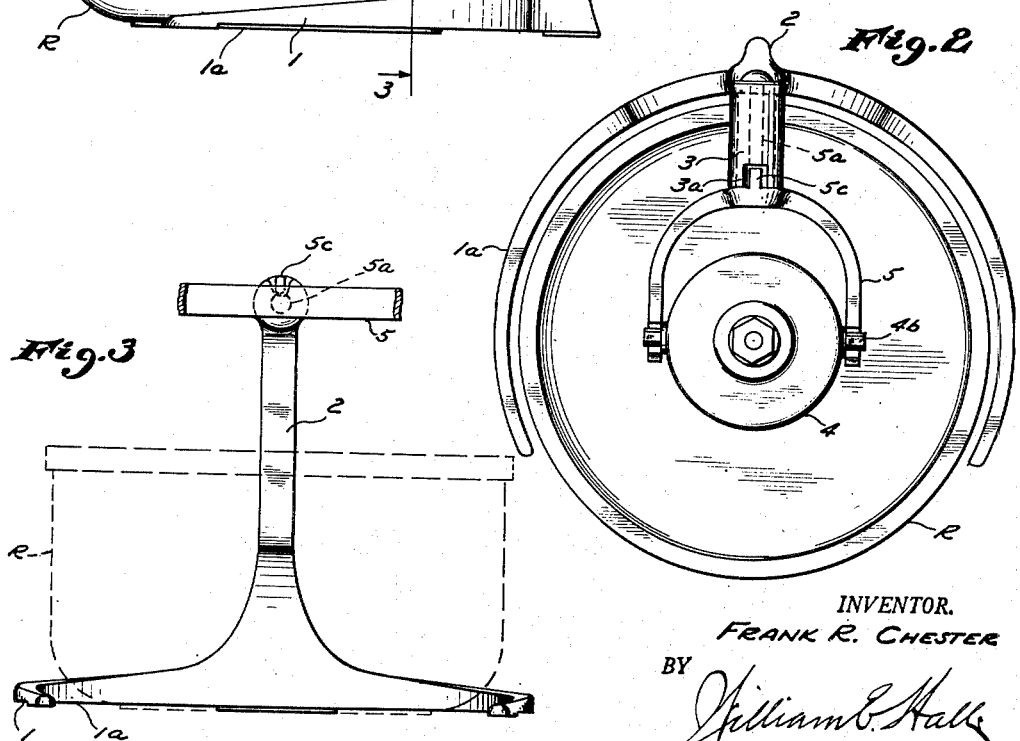
INVENTOR.
FRANK R. CHESTER
BY
William E. Hall
ATTORNEY Oct. 3, 1950     F. R. CHESTER     2,524,425
CHANGE SPEED GEARING FOR MIXERS
Filed Nov. 12, 1946     3 Sheets-Sheet 2

INVENTOR.
FRANK R. CHESTER
BY
William E. Hall
ATTORNEY

Oct. 3, 1950   F. R. CHESTER   2,524,425
CHANGE SPEED GEARING FOR MIXERS
Filed Nov. 12, 1946   3 Sheets-Sheet 3

INVENTOR.
FRANK R. CHESTER
BY
William B. Hall
ATTORNEY

Patented Oct. 3, 1950

2,524,425

UNITED STATES PATENT OFFICE 2,524,425

CHANGE-SPEED GEARING FOR MIXERS

Frank R. Chester, Santa Monica, Calif.

Application November 12, 1946, Serial No. 709,289

6 Claims. (Cl. 74—812)

My invention relates to a mixer, or other device, particularly adapted for impelling operating members at different speeds.

One of the principal objects of this invention is to provide a mixer for domestic or similar use in which the mixing means may be moved about in various directions in the receptacle containing the product to be mixed, stirred, or agitated.

Another important object of this invention is to provide novel means of supporting the mixing means, so that it may be conveniently manually directed in the position desired.

An important object also of this invention is to provide a mechanism for a mixer, or similar device, whereby the mixing, stirring, or agitating element, or elements, may be rotated or impelled at different speeds without change of gear or other operative connecting mechanism, and whereby such change of speed is effected by merely reversing the drive means.

A further important object of this invention is to provide novel, simple, and economical means for operatively connecting the drive means to the mixing, stirring, or agitating element, or elements, for operating the same at different speeds, and connecting or operating means of the class which will not readily get out of order.

A still further important object of this invention is to provide novel and simple gear means for operating a mixing, stirring, or agitating element, or elements, at different speeds, and novel and simple means for connecting the same to such element, or elements, when the drive means is reversed.

Still another important object of this invention is to provide a mixer unit which may be readily and freely manipulated in or by the hand of the user.

With these and other objects in view, as will appear hereinafter, I have devised a mixer or similar device of this class having certain novel features of construction, combination, and arrangement of parts and portions, as will be hereinafter described in detail and particularly set forth in the appended claims, reference being had to the accompanying drawings and to the characters of reference thereon, which form a part of this application, in which:

Fig. 1 is a side elevational view of my invention incorporated in a food mixer, portions thereof being broken away and in section to facilitate the illustration;

Fig. 2 is a top view thereof,

Fig. 3 is a sectional elevational view thereof, taken through 3—3 of Fig. 1;

Figure 4:
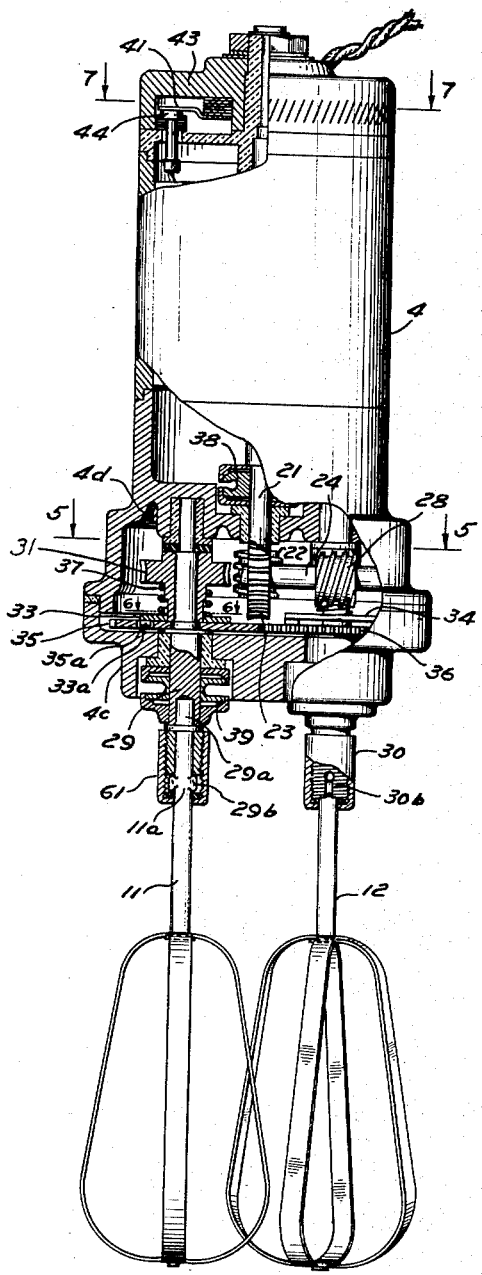
Fig. 4 is an enlarged elevational view of the motor for driving the mixer, and showing operating elements connected thereto, and also showing portions broken away and in section to facilitate the illustration.

My device, as shown in the drawings, is supported on a support or frame consisting of a large base 1, a pedestal 2 extending upwardly from one end or side of the base, and an overhanging arm 3 extending laterally from the upper end of the pedestal and in opposed relation to the base 1.

From this arm is supported or suspended the drive means, which is in the form of a motor 4, the support or suspension being by means of a gimbal construction, whereby the drive means, or motor, and the operating elements extending therefrom, may be readily turned, shifted, or swung in various directions.

The essential element of the gimbal or gimbal construction is a semi-circular yoke 5 having intermediate its ends a stub rock shaft $5^a$, which is rotatably mounted in a horizontal bearing constituting the arms 3. The motor 4, the axis of which is normally substantially vertical, has trunnions $4^a$ at its diametrically opposite sides, which are rockingly mounted in diametrically opposed recesses $5^b$ located at the ends of the arms of the yoke 5.

The recesses $5^b$ are open at their upper ends, so that the motor may be readily removed, and at any time, from its support on the yoke by merely lifting the motor therefrom, thereby providing ready and sanitary means of cleaning the operating elements carried thereby.

The trunnions $4^a$ are elongated vertically beyond and above their axis, as indicated by $4^b$, and such elongations serve as stops for preventing the complete rotation of the motor about a horizontal axis, or for limiting the amplitude of the rocking of the motor. Likewise the yoke 5 has a stop $5^c$ extending above the shaft $5^a$ for preventing rotation of the yoke 5 or limiting the amplitude of rocking of the yoke 5 about the axis of the shaft 5a, the stop 5c being limited by engagement with the opposite side portions of a recess 3a provided at the upper portion of the bearing and at the end nearest the body of the yoke 5. Such provision of the limit means on the bearing 3, the yoke 5, and the motor 4 limits the extent of the swinging of the motor 4 in all directions on or with respect to the arm 3.

The drive means or motor is provided with a pair of horizontally spaced apart and parallel downwardly directed operating, stirring, or agitating members or elements, or beaters 11 and 12, above referred to, which may be constructed similarly to those used in ordinary food mixers or egg beaters. These members or elements 11 and 12 are operated by the motor 4, as will be hereinafter more specifically described. The mounting of the motor 4, as described above, permits these operating members or elements 11 and 12 to be moved freely in all directions, so as to mix, stir, or agitate the product in all portions of a receptacle R placed therebelow, or between the spaced feet 1a of the base 1 of the support. That is, the members or elements 11 and 12 may be freely swung about in the receptacle, either automatically or manually, as desired, the former being effected by the construction of the elements 11 and 12 and the drive mechanism thereof.

The motor 4 has an axial shaft 21 having a worm 22 at its lower end. This worm meshes with and drives a worm gear 23, which is secured to a countershaft 24 revolubly mounted at the lower portion of the housing of the motor and to one side of the longitudinal axis thereof, as shown in Fig. 3. This countershaft is rotatably mounted at its ends in cup bearings 25 pressed into the housing, balls 26 being positioned within the bearings at the ends of the countershaft to take up the end thrust thereof.

On the countershaft and near the bearing ends thereof are secured worms 27 and 28 which may have the same or opposite direction threads, the former being shown, but the worm 27 preferably is provided with a single thread while the worm 28 has a multiple, preferably a triple or quadruple, thread.

At the opposite sides of the longitudinal axis of the motor are spindles 29 and 30 whose axes are parallel to the axis of the motor shaft. These spindles extend downwardly from the housing member or cap 4c secured to the lower end of the housing of the motor. The operating members or elements 11 and 12, above described, are detachably secured at their upper ends to the depending ends of the spindles 29 and 30.

Figure 5:
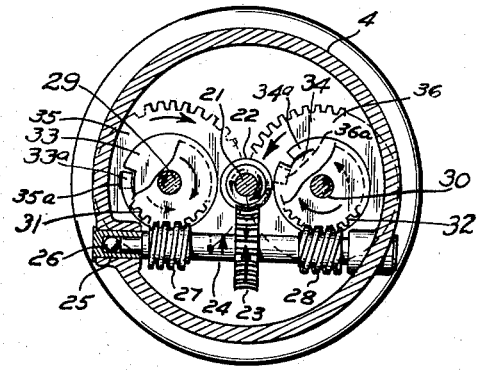
Fig. 5 is a transverse sectional view thereof, taken through 5—5 of Fig. 4.
Figure 6:
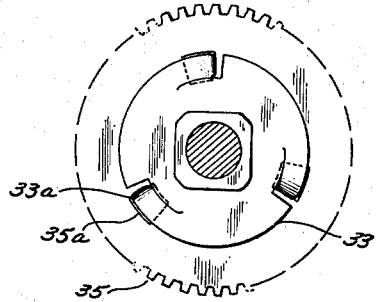
Fig. 6 is a fragmentary sectional view thereof, taken through 6—6 of Fig. 4.

Near the inner ends of the spindles 29 and 30 are rotatably mounted worm gears 31 and 32, which mesh with and are continuously operated by the worms 27 and 28, respectively. The lower ends of the hubs of the worm gears 31 and 32 are splined, and on these splined portions are slidably mounted over-riding clutch members 33 and 34 which consist essentially of discs having angularly downwardly directed lugs 33a and 34a, which, when the worm gears 27 and 28 have the same direction threads, extend in the opposite angular direction downwardly from the main portions of the clutch discs, as shown best in Fig. 5.

On the spindles 29 and 30, inwardly from the housing cap 4c and below the clutch discs 33 and 34, are spur gears 35 and 36 which mesh with each other, so that the spindles 29 and 30 are rotated at the same speed in opposite directions. The lugs 33a and 34a may enter perforations 35a and 36a in the gears 35 and 36 in order to rotate the same, or they may rest and slide freely upon the upper surfaces of these gears. Only the lugs of one clutch disc enter the recesses or perforations of its associated gear, while the lugs of the other clutch ride upon the other or its associated gear.

The clutch discs may rest by gravity upon the gears 35 and 36, but there may be provided light coil springs 37 around the hubs of the worm gears 31 and 32 for exerting a slight downward pressure upon the clutch discs, for forcing the same against the spur gears 35 and 36. If desired, the clutches may be forced into or out of engagement with their respective gears by any of the well known or recognized methods, not here shown.

As the motor shaft 21 is rotated, the countershaft 24 is also rotated through the worm 22 and the worm gear 23 causing the worms 27 and 28 on the countershaft simultaneously to rotate the worm gears 31 and 32. As the lugs 33a of the clutch disc 33 are forced into the recesses 35a of the gear 35, when the motor shaft is rotated in one direction, the spindle 29 is rotated in the same direction, while the spindle 30 is rotated in the opposite direction through the medium of the intermeshing spur gears 35 and 36. At the same time the lugs 34a of the clutch 34 ride upon the spur gear 36. As the motor shaft is reversed, the lugs 34a are forced into the recesses 36a of the gear 36, rotating the spindle 30 in the same direction, as well as the spindle 29, by reason of the intermeshing gears 35 and 36.

At the lower end of the motor housing is a grease or oil chamber 4d, and the grease or oil is retained therein by an axially compressible sealing ring 38 around the motor shaft 21, and by similar sealing rings 39 around the spindles 29 and 30.

Because the spindles 29 and 30, and the operating elements 11 and 12 respectively connected thereto, are rotated in reverse directions, the elements 11 and 12 may have intermeshing beater elements at their lower ends, as in conventional egg-beater construction.

Figure 7:
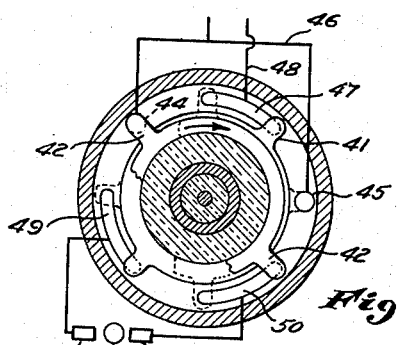
Fig. 7 is a sectional view thereof, taken through 7—7 of Fig. 4.

The motor is reversed by a switch provided at the upper end of the motor. This switch, which is shown diagrammatically in Fig. 7, is provided with rotatable contacts 41 and 42 insulated from each other and supported at the under side of a rotatable cap 43 at the upper end of the motor housing. Each of these contacts have diametrically opposed contact fingers. At the upper end of the motor are contact buttons 44 and 45, connected to one conductor 46 of a source of current, and an arcuate contact 47, connected to the other conductor 48 of the source. At the same end of the motor are provided other arcuate contacts 49 and 50, which are connected, respectively, with the brushes 51 and 52 in engagement with the commutator 53 of the motor.

When the cap 43 and the contacts 41 and 42 are in the solid-line positions, the conductors 48 and 46 are connected to the contacts 49 and 50 for rotating the motor in one direction. Shifting of the contacts 41 and 42 to the dotted-line positions connect the same conductors to the contacts 50 and 49 in the reverse order for reversing the motor.

The upper ends of the operating members or elements 11 and 12 extend axially into recesses, at the lower ends of the spindles 29 and 30, as indicated by 29a in Fig. 4. The shanks of the operating members may be upset to provide keys, as indicated by 11a and 12a in Fig. 1, and these keys may extend into slots at the lower ends of the spindles, as indicated by 29b and 30b in Fig. 1. Around the shanks of the operating members or elements are threaded caps or coupling members 61, which are secured over the threaded lower ends of the spindles 29 and 30, for removably securing the operating members or elements to the spindles.

Figure 9:
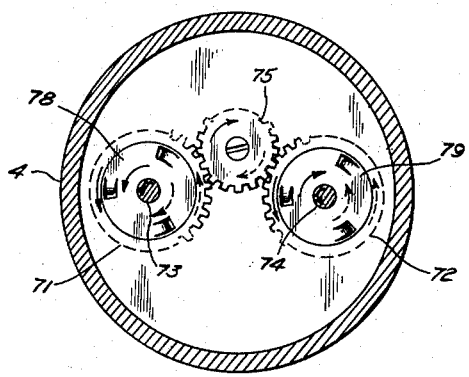
Figure 8:
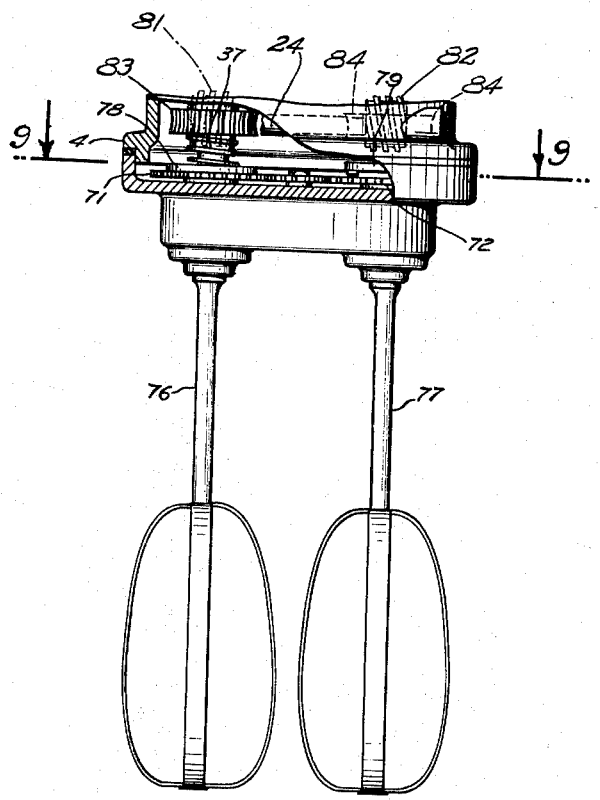
Fig. 8 is a fragmentary elevational view, partly in section, similar to Fig. 4, showing my device in a slightly modified form of construction; and, Fig. 9 is a transverse sectional view thereof, taken through 9—9 of Fig. 8.

The modified structure of Figs. 8 and 9 show spur gears 71 and 72 connected to spindles 73 and 74, but these gears are only indirectly connected by an idler gear 75. Such construction necessitates the separation of the operating, agitating, or beater elements 76 and 77, so that they do not intermesh, as shown in Fig. 8.

In this instance, the worms on the shaft 24 are of right and left-hand, the right-hand worm being designated 81 and the left-hand 82. The worm 82 is also of multiple pitch, as described in connection with the structure of Figs. 4 and 5, so that the worm gear 84 driven by the worm 82, rotates at a considerably greater speed than the gear 83 driven by the worm 81. Because the worm gears 83 and 84 are rotated in opposite directions, the clutch discs 78 and 79 have lugs which extend in the same direction, as shown in Fig. 9. Thus, when the motor is rotated in one direction and the clutch disc 78 is rotated in the direction of the arrow, the spindles 73 and 74 are also rotated in the same direction, by reason of the intermediate gear 75. At the same time the clutch disc 79 is rotated in the opposite direction and the lugs thereof, when they rest upon the gear 72, slide around in the opposite direction of the gear. When the motor is reversed, the clutch discs 78 and 79 are reversed and rotated in the direction of the dotted arrows, causing the lugs of the clutch disc 79 to rotate the spindle 74 in the direction of the arrow shown on the spindle, the direction being the same as that aforementioned. This reversal of the motor causes the clutch disc 78 to rotate in the direction of the dotted arrow and causing the lugs thereof to slide in the opposite direction over the gear 71. Thus, the operation of the clutch discs with respect to the spur gears connecting the spindles is similar to that described above in connection with the structure shown in Figs. 4 and 5.

It will be here noted that the particular worm gear drive connection from the motor shaft to the operating, agitating, or beater elements permits the latter to be extended at an angle from the motor housing instead of being extended straight or directly therefrom as shown, such angular extension not being shown.

I wish it to be understood that I do not desire to be limited to the exact details of construction shown and described, for obvious modifications will occur to a person skilled in the art.

I claim:

1. In a device of the class described, a reversible drive means, a pair of operating elements extending therefrom, gear means connecting the operating elements to operate in unison, operating gear means connected to the drive means and rotatable to one of the operating elements, ...ting means being rotatable in one di-...rating the operating elements at ...peed, other operating gear means connected to the drive means and connectable to the other operating element, said other operating means being rotatable in the opposite direction for operating the operating elements at a greater speed when the drive means is reversed, means for connecting either of the operating gear means to the operating elements when the drive means is rotated in one or the opposite direction, and means for optionally reversing the drive means.

2. In a means of the class described, a reversible drive means having a drive shaft, an operating member, a countershaft, a worm and gear means connecting the drive shaft to the countershaft, worm and gear means connected to the countershaft and rotatable in one direction for impelling the operating member at a predetermined speed, other worm and gear means, of smaller speed ratio than the last mentioned means, also connected to the countershaft and rotatable in the opposite direction when the drive shaft is reversed, and means for connecting said other worm and gear means to said operating member for impelling the operating member at a greater speed upon said reversal of the drive shaft, and means for optionally reversing the drive means.

3. In a means of the class described, a reversible drive means having a drive shaft, an operating member, a countershaft, a worm and gear means connecting the drive shaft to the countershaft, worm and gear means connected to the countershaft and rotatable in one direction for impelling the operating member at a predetermined speed, an over-riding clutch arranged to connect the latter worm and gear means to the operating member for impelling the latter at said predetermined speed, other worm and gear means, of smaller speed ratio than the last mentioned means, also connected to the countershaft and adapted to be rotated in the opposite direction when the drive shaft is reversed, another over-riding clutch connected to the latter worm and gear means, and means connecting the latter over-riding clutch to the operating member for impelling the latter at a greater speed upon said reversal of the drive shaft, and means for optionally reversing the drive means.

4. In a means of the class described, a reversible drive means having a drive shaft, a pair of operating members extending therefrom, a countershaft, a worm and gear means connecting the drive shaft to the countershaft, a worm and gear means connected to the countershaft, an over-riding clutch for connecting the latter worm and gear means directly to one of the operating means for impelling the same, a gear means connecting the operating members whereby the other operating member is connected to and driven by said one operating member, other worm and gear means connected to the countershaft, another over-riding clutch directly connecting the latter worm and gear means to said other operating member for impelling both operating members at a greater speed, and means for optionally reversing the drive means.

5. In a means of the class described, a reversible drive means for a drive shaft, a pair of operating members, means operatively connecting the operating members, a countershaft, a worm and gear means connecting the drive shaft to the countershaft, worm and gear means connecting the countershaft to one of the operating members and rotatable in one direction for impelling the operating members at a predetermined speed, other worm and gear means, of smaller speed ratio than the last mentioned means, connecting the countershaft to the other operating member and adapted to be rotated in the opposite direction, when the drive shaft is reversed, for impelling the operating members at a greater speed, and means for optionally reversing the drive means.

6. In a means of the class described, a reversible drive means for a drive shaft, a pair of operating members, means operatively connecting the operating members, a countershaft, a worm and gear means connecting the drive shaft to the countershaft, worm and gear means connected to the countershaft and rotatable in one direction for impelling the operating members at a predetermined speed, an over-riding clutch arranged to connect the latter worm and gears means to one of the operating members for impelling the operating members at said predetermined speed, other worm and gear means, of smaller speed ratio than the last mentioned means, connected to the countershaft and adapted to be rotated in the opposite direction, when the drive shaft is reversed, another over-riding clutch arranged to connect the latter worm and gear means to the other operating member for impelling the operating members at a greater speed, and means for optionally reversing the drive means.

FRANK R. CHESTER.

REFERENCES CITED

The following references are of record in the file of this patent:

UNITED STATES PATENTS

| Number | Name | Date |
|---|---|---|
| 599,508 | Le Fevre | Feb. 22, 1898 |
| 1,169,902 | Woodrow | Feb. 1, 1916 |
| 1,552,516 | Sternkopf | Sept. 8, 1925 |
| 1,905,114 | Lauterbur et al. | Apr. 25, 1933 |
| 2,013,887 | Jeppsson | Sept. 10, 1935 |
| 2,299,563 | Carlson et al. | Oct. 20, 1942 |
| 2,325,434 | Stiles | July 27, 1943 |
| 2,372,667 | Forsyth et al. | Apr. 3, 1945 |

FOREIGN PATENTS

| Number | Country | Date |
|---|---|---|
| 138,113 | Austria | June 25, 1934 |